United States Patent
Leach

(10) Patent No.: US 6,712,270 B2
(45) Date of Patent: Mar. 30, 2004

(54) POSITIONING OF PHOTODETECTORS IN OPTICAL SCANNING MODULES FOR USE IN BAR CODE READERS FOR REDUCING SPECULAR REFLECTION

(75) Inventor: Robert J. Leach, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/219,702

(22) Filed: Aug. 15, 2002

(65) Prior Publication Data

US 2004/0031848 A1 Feb. 19, 2004

(51) Int. Cl.[7] .................................................. G06K 7/14
(52) U.S. Cl. ................... 235/454; 235/459; 235/462.17
(58) Field of Search ................................ 235/454, 459, 235/462.01, 462.14, 462.17

(56) References Cited

U.S. PATENT DOCUMENTS 3,978,317 A * 8/1976 Yamaguchi et al. ........ 235/454
4,962,980 A * 10/1990 Knowles ..................... 235/467
6,114,712 A * 9/2000 Dvorkis et al. ......... 235/472.01
6,494,375 B1 * 12/2002 Ishibashi et al. ....... 235/462.11

FOREIGN PATENT DOCUMENTS

JP          411259592    *  9/1999   ............ G06K/7/10

* cited by examiner

Primary Examiner—Daniel St. Cyr
(74) Attorney, Agent, or Firm—Kirschstein, et al.

(57) ABSTRACT

An optical scan module includes a scanner for scanning a scanning beam over a target plane at which indicia to be electro-optically read is located, and a pair of spaced-apart detectors for sensing light reflected from the indicia over respective fields of view. The detectors have optical axes intersecting each other, generate respective electrical signals indicative of the indicia, and are connected to a multiplexer for selectively acquiring one of the signals based on the direction of the scanning beam. The acquired signal is decoded by a decoder.

8 Claims, 5 Drawing Sheets

POSITIONING OF PHOTODETECTORS IN OPTICAL SCANNING MODULES FOR USE IN BAR CODE READERS FOR REDUCING SPECULAR REFLECTION

RELATED APPLICATIONS

The present application is related to U.S. patent application Ser. No. 10/125,149 filed Apr. 18, 2002 which is hereby incorporated by reference.

BACKGROUND OF THE INVENTION

1. Field of the Invention

The field of the invention relates to electro-optical readers or scanning systems, such as bar code symbol readers, and more particularly to positioning of photodetectors or optical collection assemblies used in a scanning module to reduce specular reflection.

2. Description of the Related Art

Electro-optical readers, such as bar code symbol readers, are now very common. Typically, a bar code symbol comprises one or more rows of light and dark regions, typically in the form of rectangles. The widths of the dark regions, i.e., the bars and/or the widths of the light regions, i.e., the spaces, between the bars encode information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy-of data input for a wide variety of applications. The ease of data input in such systems facilitates more frequent and detailed data input, for example to provide efficient inventories, tracking of work in progress, etc. To achieve these advantages, however, users or employees must be willing to consistently use the readers. The readers therefore must be easy and convenient to operate.

A variety of scanning systems is known. One particularly advantageous type of reader is an optical scanner which scans a beam of light, such as a laser beam, across the symbols. Laser scanner systems and components of the type exemplified by U.S. Pat. Nos. 4,387,297 and 4,760,248, which are owned by the assignee of the instant invention and are incorporated by reference herein, have generally been designed to read indicia having parts of different light reflectivity, i.e., bar code symbols, particularly of the Universal Product Code (UPC) type, at a certain working range or reading distance from a hand-held or stationary scanner.

In the laser beam scanning systems known in the art, a single laser light beam from a light source is directed by a lens or other optical components along a light path toward a target that includes a bar code symbol on a target surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the symbol, or scan the field of view of a sensor of the scanner, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever et al. describes laser, optical and sensor components mounted on a drive for repetitive reciprocating motion either about an axis or in a plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam from a single source. Instead of a single linear array of light sources, a multiple-line array may also be employed, thereby producing multiple scan lines. Such type of bar code reader is disclosed in U.S. Pat. No. 5,258,605 to Metlitsky et al.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal. Different photodiode arrangements are described in U.S. Pat. Nos. 5,635,700; 5,682,029; and 6,213,399.

In retroreflective light collection, a single optical component, e.g., a reciprocally oscillatory mirror, such as described by Krichever et al. in U.S. Pat. No. 4,816,661 or by Shepard et al. in U.S. Pat. No. 4,409,470, both herein incorporated by reference, and U.S. Pat. No. 6,114,712, scans the beam across a target surface and directs the collected light to a detector. The mirror surface usually is relatively large to receive as much incoming light as is possible. Only a small detector is required since the mirror can focus the light onto a small detector surface, which increases signal-to-noise ratio.

Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same optical component used for scanning. Instead, the detector is independent of the scanning beam, and is typically constructed to have a large field of view so that the reflected laser light traces across the surface of the detector. Because the scanning optical component, such as a rotating mirror, need only handle the outgoing light beam, it can be made much smaller. On the other hand, the detector must be relatively large in order to receive the incoming light beam from all locations in the scanned field.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodetector may initially be filtered and processed by circuitry and/or software to remove noise, adjust the dynamic range, or compensate for signal non-uniformities. Samples may then be taken of the analog signal, and applied to an analog-to-digital converter to convert the samples to digital data. See, for example, U.S. Pat. No. 6,170,749, which is hereby incorporated by reference. Alternatively, analog circuitry may be used to digitize the shape of the signal.

A variety of mirror and motor configurations can be used to move the beam in a desired scanning pattern. A scanner which produces an elongated scan line is described in U.S. Pat. No. 5,621,203. U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven-in-alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted. U.S. Pat. No. 6,247,647 describes an arrangement for providing either a multiple line, or single line, scan pattern by means of a controller. All of the above-mentioned U.S. patents are incorporated herein by reference.

In electro-optical scanners of the type discussed above, the implementation of the laser source, the optics, the mirror structure, the drive to oscillate the mirror structure, the photodetector, and the associated signal processing and decoding circuitry as individual components all add size and weight to the scanner. In applications involving protracted use, a large, heavy scanner can produce user fatigue. When use of the scanner produces fatigue or is in some other way inconvenient, the user is reluctant to operate the scanner. Any reluctance to consistently use the scanner defeats the data gathering purposes for which such bar code systems are intended. Also, a need exists for an interchangeable, compact, slim module able to fit into small compact devices, such as notebooks, portable digital assistants, pagers, cell phones, and other pocket appliances.

Thus, an ongoing objective of bar code reader development is to miniaturize the reader as much as possible, and a need still exists to further reduce the size and weight of the scan module and to provide suitable collection optics in a relatively thin or flat scan module, so that the single scan line can be elongated close to the reader and still enable a symbol to be read.

SUMMARY OF THE INVENTION

Objects of the Invention

It is an object of the present invention to provide a pair of detectors for use in a bar code reader capable of emitting an elongated scan line close to the module.

It is another object of the invention to provide a module with dual, spaced apart detectors having different orientations and fields of view to minimize the effects of specular reflection.

It is a further object of the present invention to provide a collection optic arrangement for use in non-retroreflective scan modules with multiple photodetectors.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which invention could be of significant utility.

Features of the Invention

Briefly, and in general terms, the present invention provides an optical scan module having a base; a light source mounted on the base for emitting a light beam; a scanning assembly for receiving the light beam and for generating therefrom a scanning beam directed to an indicia to be read for reflection therefrom; first and second spaced apart detectors receiving the reflected light represented by the indicia, with each detector having a different orientation and field of view; and means for selectively acquiring the signal from either the first or the second detector and applying such signal to a decoder.

The invention further provides an arrangement for uniformly collecting light over a scan line swept over a symbol to be electro-optically read, with a pair of photodetectors spaced apart of each other and having fields of view that overlap each other at a working distance in which the symbol is located; and means for analyzing the signal from each photodetector and selecting one of the photodetectors for providing a signal to the decoder.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

The invention relates to bar code readers of the type generally described in the above identified patents and patent applications for reading bar code symbols. As used in this specification and the claims, the term "bar code symbol" is intended to be broadly construed and to cover not only symbol patterns composed of alternating bars and spaces, but also other graphic patterns, such as dot or matrix array pattern, and, in short, indicia having portions of different light reflectivity or surface characteristics that results in contrasting detected signal characteristics that can be used for encoding information and can be read and decoded with the type of apparatus disclosed herein.

Figure 1:
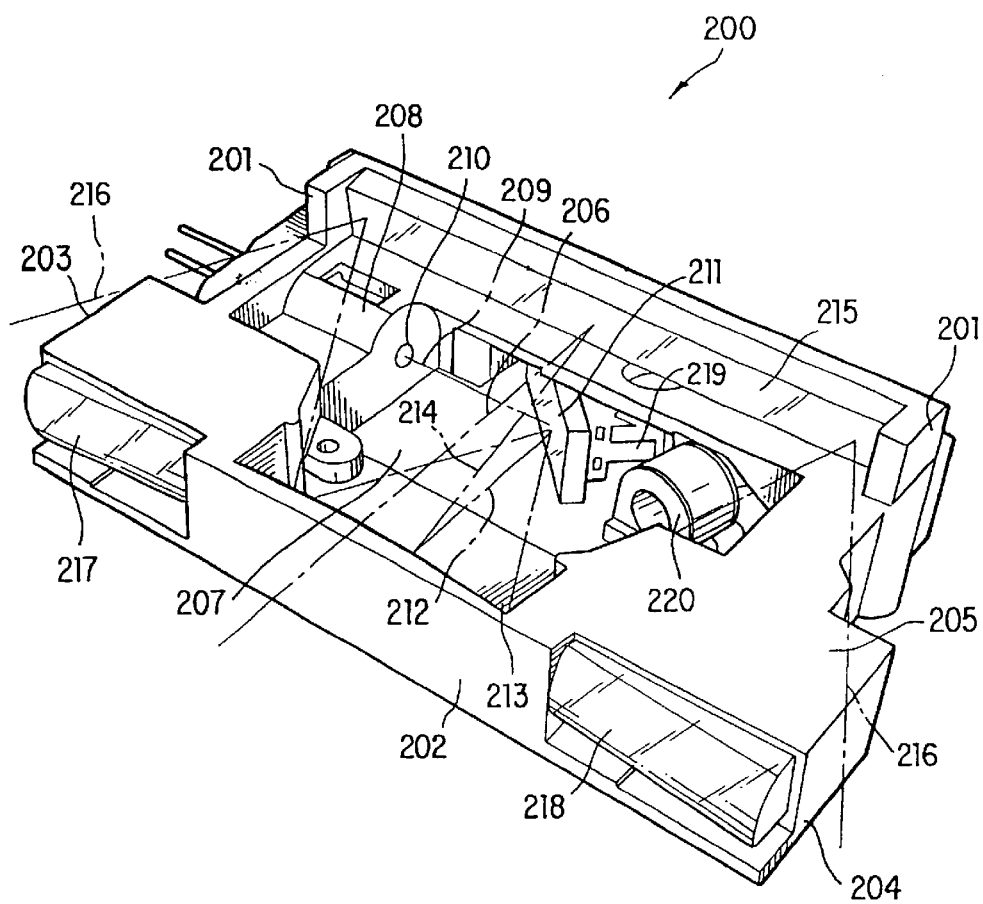
FIG. 1 is a perspective view of an optical assembly in which the collection and detector assemblies according to the invention may be embodied.

As a preferred embodiment, we describe the implementation of the collection optics of the present invention in a laser scanning, bar code reading module similar to the module illustrated in FIG. 1. The modular device of FIG. 1 is generally of the style disclosed in U.S. Pat. No. 5,367,151, issued to Dvorkis et al., assigned to Symbol Technologies, Inc. and hereby incorporated by reference herein, and also similar to the configuration of a bar code reader commercially available as part number SE 1000 or SE 1200 from Symbol Technologies, Inc. of Holtsville, N.Y. Alternatively, or in addition, features of U.S. Pat. Nos. 4,387,297 and 4,760,248 issued to Swartz et al., or U.S. Pat. No. 4,409,470 issued to Shepard et al., both such patents being assigned to Symbol Technologies, Inc., may be employed in constructing the bar code reader module of FIG. 1. U.S. Pat. Nos. 4,760,248, 4,387,297 and 4,409,470 are incorporated herein by reference.

The module 200 shown in FIG. 1 is formed from an integral frame or assembly 201 which is generally a rectangular parallelepiped in shape, having a front wall side 202, side walls 203 and 204, preferably an open top surface 205 over which a laser beam 206 is scanned along a scanning path 216, and a bottom surface (not shown) enclosed by a printed circuit board (PCB) 207 on which electrical components may be mounted. A laser diode assembly 208 is mounted on the frame 201 for producing a light beam 209, which is emitted through aperture 210 in the laser diode assembly. The lightbeam 209 is directed to the scanning mirror 211 from which it is reflected and scanned along path 212 to the fold mirror 213 (only the edge of which is seen) which is mounted on the front wall 202 of the assembly. The beam is then reflected from fold mirror 213 along path 214 to the fold mirror 215. The beam is then reflected from mirror 215 and directed along path 206 over the top surface 205 and exteriorly of the module 200 in the direction of a target, typically a bar code symbol 228 (See FIG. 2).

Light is scattered or reflected from the symbol to a pair of optical collection lenses 217 and 218 behind which are a pair of photodetectors. The front surfaces of such lenses, according to the first preferred embodiment of the present invention, are cylindrical, with an axis not parallel to the scan line otherwise they would have the same orientation. (see FIG. 1)

FIG. 1 also depicts a drive coil 220 and moving mirror assembly 219 which supports the mirror 211 and moves in response to current changes in the drive coil 220.

The laser diode assembly 208 may be operated in a continuous "constant power" mode, pulsed, or modulated with different power levels, depending on the specific application. It is also known to provide circuitry to maintain the laser diode at a predetermined output power level using a closed-loop feedback circuit using a monitor photodiode associated with the diode.

The optical subassembly associated with the laser diode assembly 208 may include a focusing lens and/or aperture stop of the following lens types, depending on the application: spherically symmetric glass or plastic lenses; asspheric glass or plastic lenses, rotationally symmetric as well as non-rotationally symmetric around the optical axis, such as cylindrical optical elements as well as including gradient index lenses, Fresnel lenses, binary optical lenses, or multi-level binary optical lenses; lens systems where the lens diameter itself acts as a functional aperture stop for the system; or holographic optical elements, including, but not restricted to, Fresnel "zone plate" optics.

Figure 2:
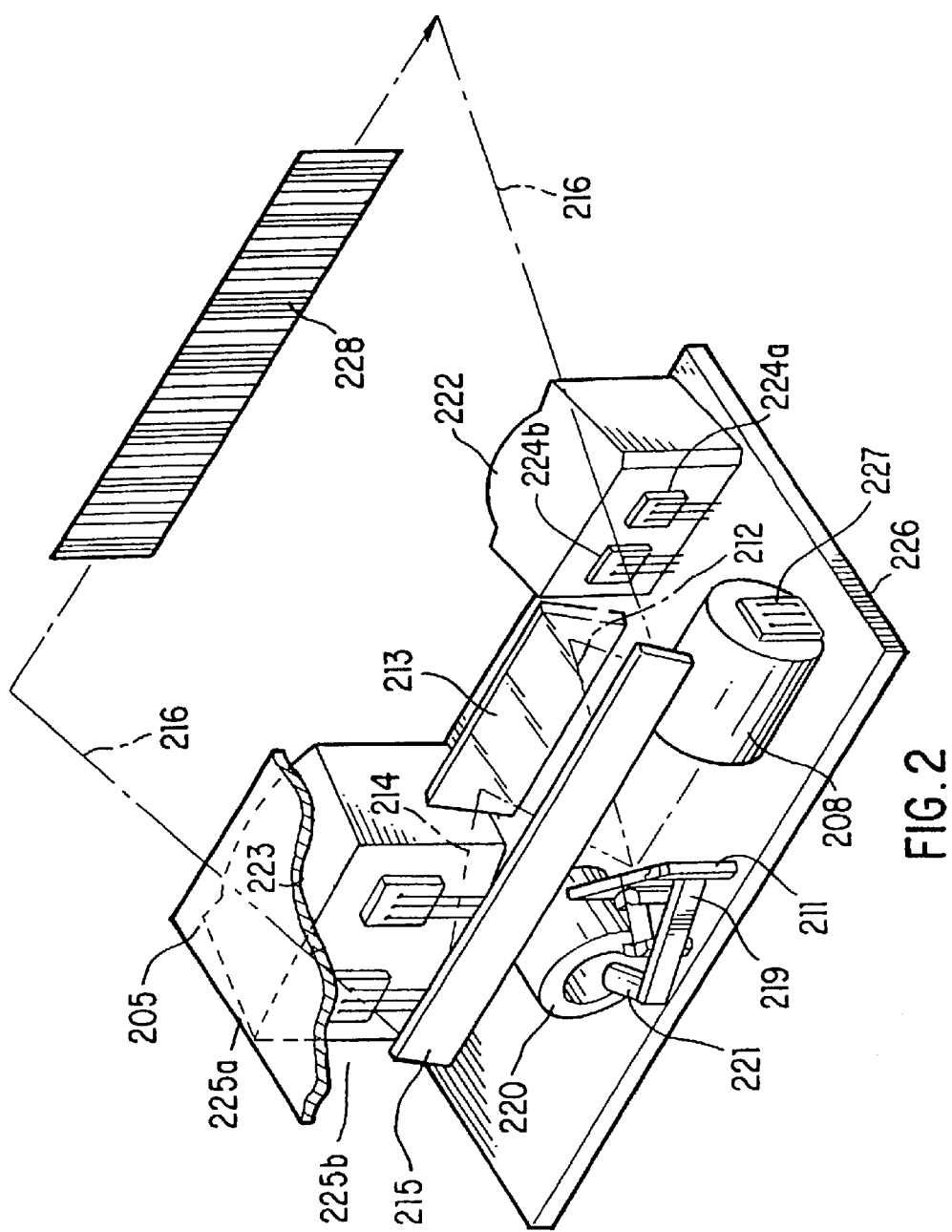
FIG. 2 is another optical assembly in which the invention may be embodied.

Turning next to another embodiment, shown in FIG. 2 from a different perspective, the laser beam is directed to an optical element 211, such as a planar mirror, which is moved so as to cause the beam to be deflected into a scanning beam 216 which is directed exteriorly of the module 200 towards a target plane. The beam 216 is focused by the optical subassembly to form a spot on the target plane which moves along a scanning path across and through the bars of the bar code symbol 228 on the target plane as the mirror 211 moves.

The optical element 211 is mounted on the moving mirror assembly 219 which is caused to oscillate when alternating current is introduced in the coil 220. The oscillation results in a movement of the clement 211 through an arc about a pivot axis.

The scanning mirror 211 is mounted for oscillation about an axis, this being achieved by virtue of the interaction between a permanent magnet 221 and a driven electromagnetic coil 220. A suitable driving signal is applied to the coil, via the PCB 207 and coil electrical contacts.

The scanner motor drive shown in the figures is exemplary, and may be replaced with any type of mechanism for effecting a scanning motion of the laser beam in one or two dimensions. For example, the scanner motor drive could comprise any of the configurations disclosed in U.S. Pat. Nos. 5,581,067 and 5,367,151, both of which are herein incorporated by reference. In this way, the optics assembly may be used as a component in a variety of scanner designs.

The light reflected from the symbol is received by the photodetectors 224a, 224b, 225a and 225b which are illustrated as discrete devices mounted behind the collection lenses 222.

The subassembly or device of FIG. 1 may be implemented in any type of bar code reader, fixed or portable.

The photodetector output signal from the four photodetectors is then passed on to suitable electronics within a PCB 226 by an electrical coupling.

Although a light masking aperture may be used in front of each photodetector for increasing the depth of focus of the photodetector, the same effect can be achieved without an aperture by appropriately specifying the area of the photodetector itself.

In another preferred embodiment, the type of motor drive used to oscillate the scan mirror can be a Mylar (trademark) leaf spring supporting an unbalanced mirror assembly. The mirror assembly is mounted to a Mylar leaf spring which flexes as the permanent magnet is driven by the AC coil imparting an oscillating force.

Yet a further alternative is a "micro-machined" mirror assembly as discussed in U.S. patent application Ser. Nos. 08/506,574 and 08/631,364 according to which the mirror is driven back and forth directly by a suitable drive motor, preferably of very small dimension. Yet a further alternative is to use a mirror of known rotating polygon type as discussed in the introduction in relation to U.S. Pat. No. 4,251,798 according to which the mirror comprises a solid body having a plurality of faces angled to one another. As the body rotates, the beam is scanned by successive rotating faces of the polygon body. In one embodiment, the Mylar motor can be used in an arrangement for onedimensional scanning while-a V-shaped taut band element can be used for two-dimensional scanning.

The preferred laser is a semiconductor laser mounted by conventional through-hole techniques on the PCB. The photodiode is preferably an SMD ("surface mounted device") device as is the AC coil for the Mylar leaf spring motor. This eliminates the need for standoffs and hand-soldering or sockets, as are used on prior art scanners. Typically, the laser will be a standard packaged edge-emitting laser. For minimum cost, the laser focusing is not adjustable, and the laser is simply installed with its mounting flange in contact with a shoulder molded as part of a molded member. This will position the laser accurately enough with respect to a molded focusing lens to provide adequate performance within an inexpensive scanner. The fact that the focusing lens is molded as part of the same component as the shoulder minimizes tolerance build-ups that could otherwise cause improper focusing.

The collector optics 217, 218 may be coated with a reflective coating so that light impinging upon it will be reflected toward the photodetector. This coating may also cover that part of the molded member that serves as a housing for the photodiodes. This will render the optics assembly opaque in that area to prevent any light from reaching the photodiode except via an aperture and a filter placed in front of each photodiode.

This reflective coating may also serve another function. Typically, the coating will be a thin film of metal such as gold, aluminum or chrome. These films are electrically conductive. Accordingly, the film also acts as an electro-magnetic interference shield for the photodiodes. The use of a surface coating to protect the photodiodes enables the usual EMI shield to be dispensed with, thereby eliminating both the cost of a separate shield and the labor to have it installed within the assembly. The coating is electrically grounded.

The use of an unbalanced mirror, i.e., one in which no counterweights are provided in the mirror assembly 219, is particularly suitable in implementations in which the mirror is driven at a speed of greater than 100 scans per second. With an unbalanced mirror, since the attachment points of the mirror to the flexible springs is not the center of mass of the mirror assembly, while the mirror is at rest, gravity will exert a relatively greater force on the side of the mirror assembly having the greater mass, causing the mirror to "droop" on its heavier side and pull on the flexible springs. Of course, the effect of such force depends on the orientation of the scanner with respect to the force vector of gravity. The same "drooping" effect is present when the mirror is scanning at relatively low speeds. Hence, in such applications, the use of a balanced mirror would be preferred. A balanced mirror, however, requires additional mass be added to the mirror, or mirror assembly, which is a drawback in terms of operating design weight and the power requirements.

In the embodiment of high speed operation (i.e., at more than 100 scans per second), the material composition, size, shape and thickness of the springs may be appropriately selected to achieve the desired resonant frequency. For example, for operation at approximately 200 scans/second, the selection of a Mylar spring with a thickness of 4 mils is appropriate. For operation at 400 scans/second, a stainless steel spring with a thickness of about 3 mils is preferred.

Typically, the intensity of the collected reflected light signal from the middle portion of the scan line is much higher than the reflected light signal collected from the ends of the scan line when using a conventional single collection lens design in front of the photodetector. One embodiment of the present invention is to use a lens array(s). The lens array may have two or more collection lenses. Each individual lens of the array collects a reflected light signal from a particular portion of the scan line. The field of view (FOV) of each lens may overlap. The size of each lens and orientation may be optimized in such a way as to provide desired signal intensity uniformity along the scan line.

A specular reflection of laser light generally will prevent proper operation of a bar code reader if no provision has been made to eliminate it's influence such as the use of a polarizing filter. This invention eliminates the influence of the specular reflection by multiplexing the input source and providing a spatial arrangement of dual collection system such that the specular reflection is outside the field of view of the detector then being used for reading.

Figure 3A:
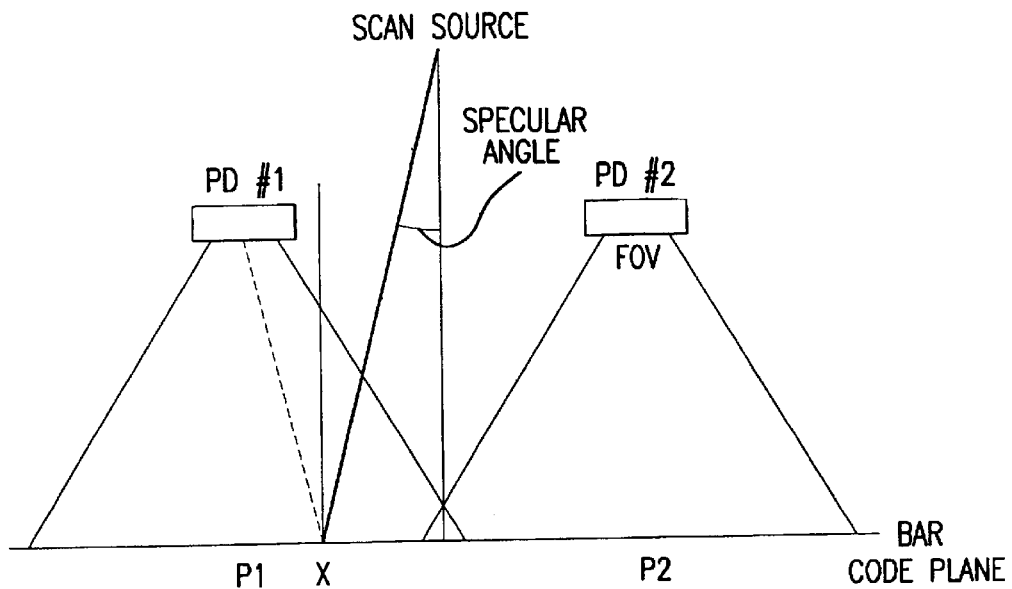
FIG. 3(a) is a top plan view of the detector arrangement according to the prior art.
Figure 3B:
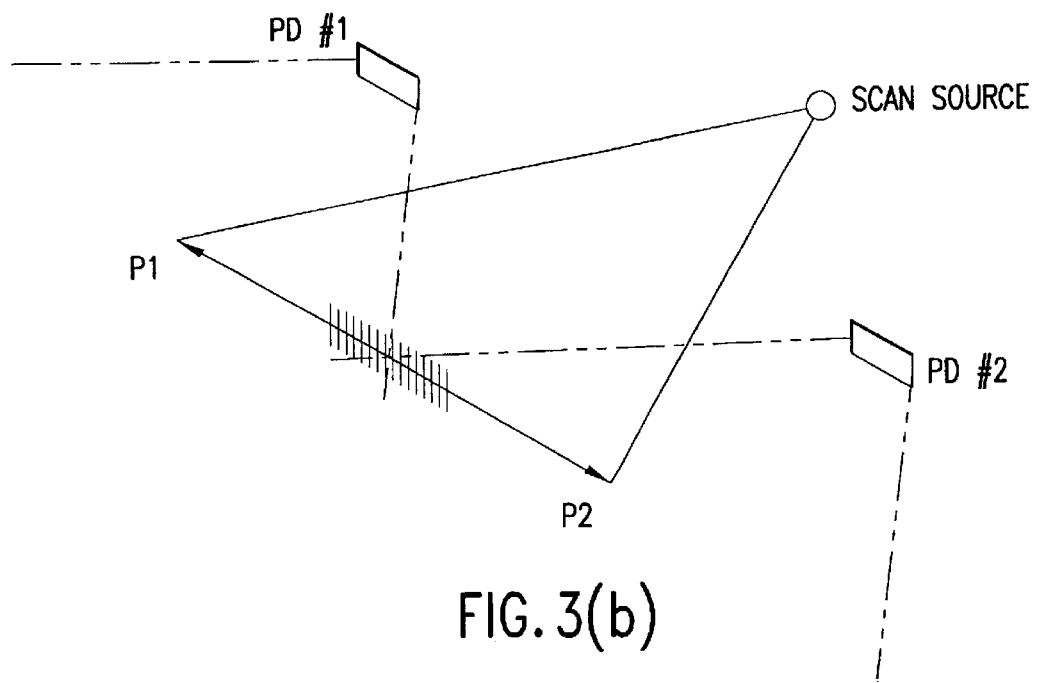
FIG. 3(b) is a perspective view of the detector arrangement of FIG. 3(a)
Figure 4A:
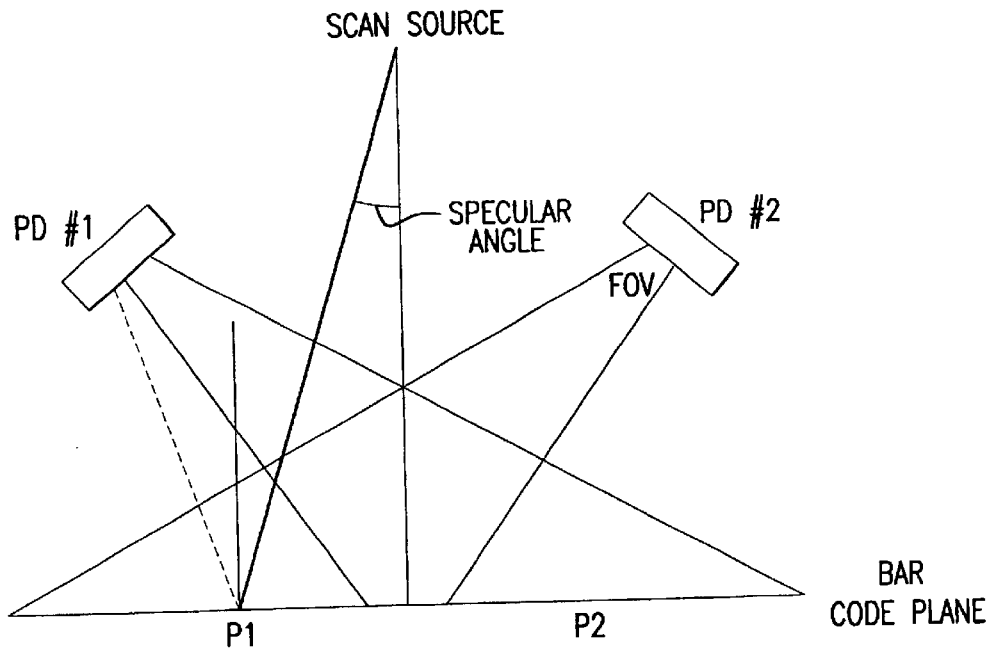
FIG. 4(a) is a top plan view of the detector arrangement according to the present invention.
Figure 4B:
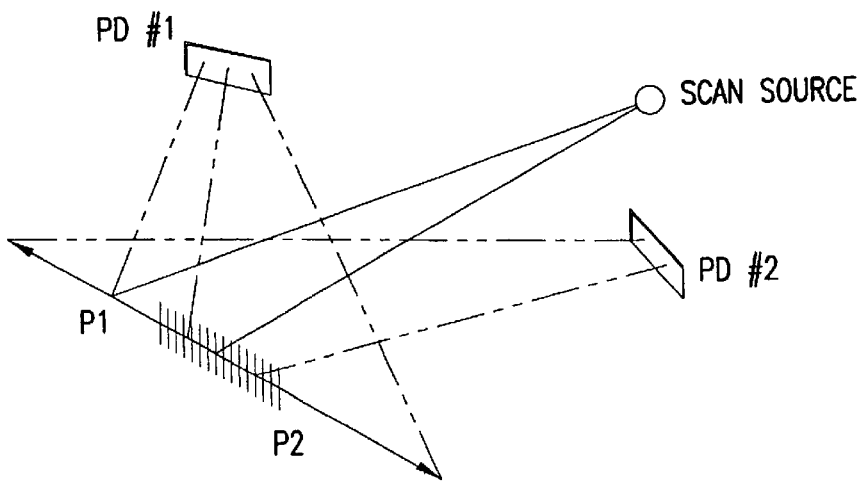
FIG. 4(b) is a perspective view of the detector arrangement of FIG. 4(a)

FIG. 3(a) is a top plan view of the detector arrangement according to the prior art; FIG. 3(b) is a perspective view of the detector arrangement of FIG. 3(a);

FIG. 4(a) is a top plan view of the detector arrangement according to the present invention; FIG. 4(b) is a perspective view of the detector arrangement of FIG. 4(a).

FIGS. 3(a) and 3(b) show a non-retro-reflective bar code reader with a prior art dual detector optical collection system. Generally this dual detector system is normally used to provide uniform light collection with respect to the scan angle and therefore the electric current output from both detectors are added. The Figures show the laser beam at the specular angle of photodetector PD #1. Since point X(see FIG. 3a) is out of the field of view of photodetector PD #2, no useful signal is received and the reflected light from the bar code symbol will not be detected unless the pitch of the bar code with respect to the scanning beam is greater than approximately five degrees.

FIGS. 4(a) and 4(b) show a non-retro reflective bar code reader according to the present invention where the orientation and field of view of the detectors are such that the specular reflection is outside the field of view of the detector used for light collection. In other words, detector PD #1 collects light when the laser beam is scanning on the side labeled P2, and detector PD #2 collects light when the beam is on the side labeled P1. Note that the reflection from symbol at the specular angle (shown by the dotted reflected light line) hits PD #1. The electronics as shown in FIG. 5 must provide a means for alternatingly selecting the detectors to use for reading, since they cannot be added or the specular reflection immunity will be lost.

There will be a greater non-uniformity of light collection with respect to scan angle with this collection system that would need to be corrected through other means. Since the primary application for this invention is contact bar code readers, the overall reduced collection efficiency should not result in serious degradation of performance.

As a result, the strength of the collected light signal from the signals received from the ends of the scan line are effectively increased, while the signal received from the middle is reduced.

Figure 5:
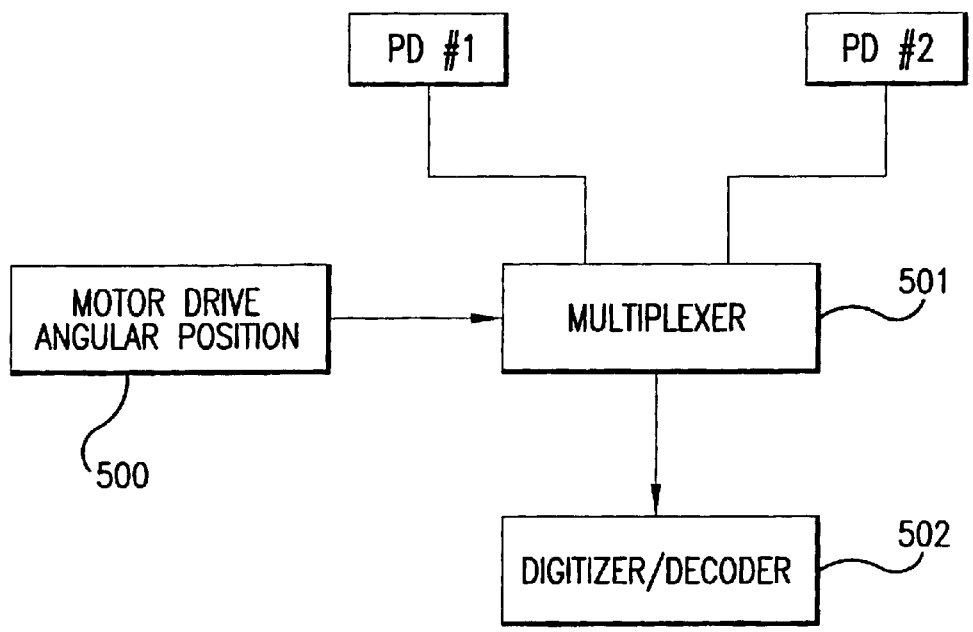
FIG. 5 is a block diagram of a circuit in the present invention.

FIG. 5 is a highly simplified block diagram of a circuit processing signals from photodiodes PD #1 and PD #2 according to the present invention. The two signals are applied to a multiplexer 501, which is controlled by a motor drive angular position control unit 502. The appropriate photodiode, PD #1 or PD #2, is selected on the basis of the control signal, and the photodiode signal is the applied to the digitizer/decoder; 502.

In addition to the preferred embodiment in which the photodetection is selected as an automatic result of the direction of the outgoing scanning beam, as determined by the angular position control unit 502, adaptive techniques may be utilized. For example, both signal lines may be monitored, and when an unusually high peak signal occurs on one line, but not the other, it may be assumed that the peak signal is a specular reflection, and that the associated signal should therefore be disregarded and the other signal line used for determining the data signal.

Hence, in accordance with this invention, a relatively long scan line is generated closely adjacent the reader, and a symbol swept by such a scan line is read without requiring complex electronics to condition and process the return signal whose amplitude would otherwise vary unacceptably.

It will be understood that each of the features described above, or two or more together, may find a useful application in other types of scanners and bar code readers differing from the types described above.

While the invention has been illustrated and described as embodied in the collection optics for a scan module for an electro-optical scanner, it is not intended to be limited to the details shown, since various modifications and structural changes may be made without departing in any way from the spirit and scope of the present invention. In particular, it will be recognized that features described in relation to one embodiment can be incorporated into other embodiments as appropriate in a manner that will be apparent to the skilled reader.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims.

I claim:

1. An optical scan module, comprising:

a) a support;

b) a light source on the support for emitting a light beam;

c) a scanner on the support for scanning the light beam in a scan direction over a target plane at which indicia to be electro-optically read is located for reflection from the indicia;

d) a first detector on the support, and operative for sensing light reflected from the indicia over a first field of view and for generating a first electrical signal indicative of the indicia, the first detector having a first optical axis extending to the target plane within the first field of view;

e) a second detector on the support and spaced away from the first detector, and operative for sensing light reflected from the indicia over a second field of view and for generating a second electrical signal indicative of the indicia, the second detector having a second optical axis extending to the target plane within the second field of view, the first and second optical axes intersecting each other;

f) a multiplexer connected to the detectors for selectively acquiring one of the electrical signals as a function of the scan direction of the light beam; and g) a decoder connected to the multiplexer for decoding the acquired one of the electrical signals.

2. The module of claim 1, wherein the support includes a printed circuit board.

3. The module of claim 1, wherein the light source is a laser.

4. The module of claim 1, wherein the scanner includes an oscillatable mirror, and a drive for oscillating the mirror.

5. The module of claim 1, wherein each detector is a photodiode.

6. The module of claim 1, wherein the detectors include two photodiodes and two cylindrical mirrors extending along respective mirror axes that intersect each other.

7. The module of claim 1, wherein each detector includes a pair of photodiodes.

8. The module of claim 1, wherein the scanner includes an oscillatable mirror mounted on a shaft, and further comprising a control unit for detecting angular position of the shaft, and wherein the multiplexer is connected to the control unit.

* * * * *